US006606228B1

(12) United States Patent
Potter, IV

(10) Patent No.: US 6,606,228 B1
(45) Date of Patent: Aug. 12, 2003

(54) FAULT DETECTION CIRCUIT FOR USE WITH A POWER CONTROL DEVICE

(75) Inventor: Frederick Jerome Potter, IV, Trumbauersville, PA (US)

(73) Assignee: Ametek, Inc., Paoli, PA (US)

( * ) Notice: Subject to any disclaimer, the term of this patent is extended or adjusted under 35 U.S.C. 154(b) by 122 days.

(21) Appl. No.: 09/723,009

(22) Filed: Nov. 27, 2000

(51) Int. Cl.[7] .................... H02H 5/04

(52) U.S. Cl. .................... 361/104; 361/93.9; 361/18

(58) Field of Search .................... 361/91.1, 93.9, 361/88, 101, 103, 79, 104, 18

(56) References Cited

U.S. PATENT DOCUMENTS

| | | | | | |
|---|---|---|---|---|---|
| 3,737,887 | A | * | 6/1973 | Wakamatsu et al. | 361/104 |
| 4,031,431 | A | | 6/1977 | Gross | 307/326 |
| 4,038,584 | A | | 7/1977 | Tarchalski et al. | 361/104 |
| 4,169,271 | A | | 9/1979 | Saitoh | 357/51 |
| 4,205,223 | A | | 5/1980 | Cole | 219/501 |
| 4,210,947 | A | | 7/1980 | Koizumi | 361/18 |
| 4,441,136 | A | | 4/1984 | Hampshire | 361/88 |
| 4,673,798 | A | | 6/1987 | Contri et al. | 219/225 |
| 4,751,401 | A | | 6/1988 | Beigel et al. | 307/140 |
| 4,979,066 | A | * | 12/1990 | Kawata et al. | 323/276 |
| 5,354,967 | A | | 10/1994 | Barzilai et al. | 219/225 |
| 5,381,296 | A | | 1/1995 | Ekelund et al. | 361/106 |
| 5,536,980 | A | | 7/1996 | Kawate et al. | 307/116 |
| 5,703,463 | A | | 12/1997 | Smith | 320/13 |
| 6,031,743 | A | * | 2/2000 | Carpenter et al. | 307/48 |
| 6,114,672 | A | * | 9/2000 | Iwasaki et al. | 361/106 |

* cited by examiner

*Primary Examiner*—Kim Huynh
(74) *Attorney, Agent, or Firm*—Hayes Soloway P.C.

(57) ABSTRACT

A fault detection circuit that includes a controllable switch coupling a power source to a load. Control circuitry is provided that determines if the switch is in the proper conduction state based on a switch control signal and a signal indicative of power delivered to the load. If the switch is determined as improperly closed (conducting), the control circuitry diverts energy delivered to the load through fuse circuitry, thereby blowing a fuse and decoupling the load from the power source. In preferred embodiments, logic circuitry determines the relative states of the control switch and the load and generates a control signal to divert energy away from the load and blow a fuse.

11 Claims, 3 Drawing Sheets

| CONTROL SIGNAL | INVERTER RESULT | OUTPUT LOAD | AND LATE/CONTROL CIRCUITRY |
|---|---|---|---|
| ON = 1 | 0 | OFF = 0 | 0 |
| ON = 1 | 0 | ON = 1 | 0 |
| OFF = 0 | 1 | OFF = 0 | 0 |
| OFF = 0 | 1 | ON = 1 | 1 |

FIG. 2

FAULT DETECTION CIRCUIT FOR USE WITH A POWER CONTROL DEVICE

BACKGROUND OF THE INVENTION

1. Field of the Invention

The present invention relates to a fault detection circuit for use with a power control device to detect a short circuit in the power control device. Particularly, the fault detection circuit detects a shorted power control device by comparing the power input current and a power output current when the power control device is intended to be off. Further, the present invention uses the output of the power control device itself to open the respective circuit if that power control device is shorted. The present invention is applicable to DC or AC power switching applications. Also, a typical power control device is a solid state power switch, although the present invention is not limited to such as power control device.

2. Description of Related Art

Solid state power switches used as power control devices tend to fail in shorted states, which is often unacceptable in power switching applications. Various fault detection circuits for detecting such short circuits in power switching applications are known. In one such technique, a second solid state power switch device is used to turn off the current when a primary solid state power switch fails to respond. This method is not fail-safe, since both devices may be shorted by one large power surge. In another technique, a mechanical fuse or circuit breaker is added in series with the solid state power switch device. This technique is based on the assumption that when the solid state power switch device is shorted, so is the load. This is not always the case. Therefore, this technique fails to detect a shorted solid state power switch where the power switch is shorted but the load is not.

In yet another technique, a thermal/current fuse is placed in close proximity to a power control device such that the fuse opens the circuit when the solid state power switch carries the full load current, thereby overheating the fuse, or in the event that the temperature of the power switch exceeds the fuse's temperature rating. This technique is effective even where the power switch is shorted but the load is not. However, this technique is not fail-safe in that it requires the power control device itself to exceed the fuse's temperature or current rating in order for the circuit to be opened.

SUMMARY OF THE INVENTION

The present invention solves the aforementioned drawbacks of the prior art by providing a fault detection circuit that compares the conduction state of a switch coupling power to a load, and if the switch is improperly closed the present invention utilizes the energy delivered to the load to blow a fuse and decouple the load from a power source. In one embodiment, the present invention provides a fault detection circuit comprising an input voltage coupled to an output load through a control switch; a control signal regulating the conduction state of said control switch; and fault detection circuitry receiving said control signal and a signal indicative of the energy delivered to said load, and adapted to determine if said control switch is in the proper conduction state based on said control signal, said fault detection circuit further adapted to decouple said input voltage from said load using said energy delivered to said output load if said control switch is in an improper conduction state.

In method form, the present invention provides a method for fault detection circuit operation, comprising the steps of:

- coupling an input voltage to a load through a control switch;
- regulating the conduction state of said control switch with a control signal;
- determining if said control switch is in a proper conduction state based on said control signal and the energy delivered to said load;
- decoupling said input voltage from said load using said energy delivered to said load if said control switch is in an improper conduction state.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited only as set forth in the accompanying claims.

Other features and advantages of the present invention will become apparent as the following Detailed Description proceeds, and upon reference to the Drawings, wherein like numerals depict like parts, and wherein:

BRIEF DESCRIPTION OF THE DRAWINGS

FIG. 2 is a chart of inputs and outputs of the components of heater control circuitry in a preferred embodiment of the present invention.

DETAILED DESCRIPTION OF EXEMPLARY EMBODIMENTS

Figure 1:
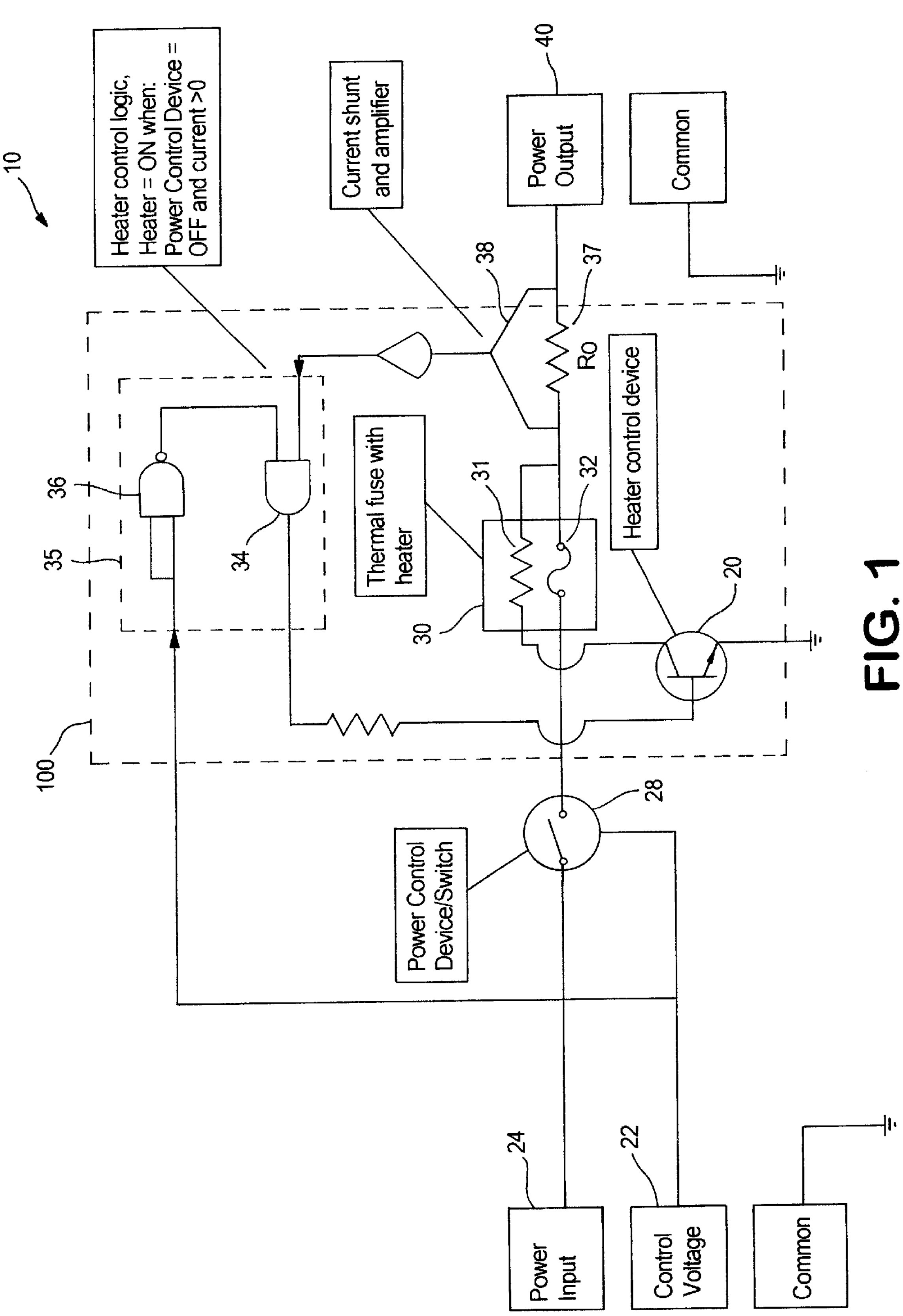
FIG. 1 is a circuit diagram of an exemplary power switching circuit of the present invention including an exemplary fault detection circuit and solid-state power switch.

FIG. 1 is circuit diagram of an exemplary power switching circuit 10, including a power input 24, control voltage 22, power control device (switch) 28, an exemplary fault detection circuit 100, and power output 40. The power input 24 supplies power to the circuit, and comprises one or more AC or DC sources. The control voltage 22 turns on or off switch 28 either allowing or disallowing, respectively, current from the power input 24 to be transmitted to the power output 40.

In order to ensure the fault detection operation of the circuit 10, a fault detection circuit 100 with control circuitry 35 is provided to determine when to open the circuit 10 based on the condition of the control voltage 22, and the conduction state of the switch 28. In the example shown in FIG. 1, the fault detection circuitry 100 includes fuse circuitry 30 for opening the circuit 10. Control circuitry 35 monitors both the control voltage 22 and the output condition to determine if the switch 28 is incorrectly conducting (i.e., failed shorted), thereby commanding fuse 30 to blow. The exemplary circuits 35 and 100 are described in greater detail below.

Fuse circuitry 30 comprises a heating resistor 31 and a thermal fuse 32 for opening the circuit 10. To determine the output condition an output sense resistor $R_o$ 37, a current shunt and amplifier 38 are provided. The signal developed across resistor 37 is fed into the control circuitry 35 to control the conduction state of the fuse control switch 20, as described below. Thus, the present invention uses the energy delivered to the load to effectuate blowing the fuse.

It should be noted that the following description assumes that switch 28 is active (conducting) high, but it will be apparent that the present invention can likewise be adapted to operate with active low switches. Switch 28 is in an improper conduction state if it conducts when control voltage 22 commands that switch 28 be open. That is, switch 28 is in an improper condition when it is shorted. In the preferred embodiment, the control voltage 22 delivers a high/on signal to the switch 28 to command the switch to close, and a low/off signal to command the switch to open. In this embodiment, note that, if the control voltage 22 is off, irrespective of the status of the power input, the switch 28 should be open, and therefore, conduction through the switch indicates an improper conduction state. The fault detection circuit 100 opens the circuit 10 when the control voltage 22 is off and the switch 28 conducts.

Control circuitry 35 determines whether the above condition is satisfied, and generates a signal that causes the opening of the circuit 10. In the preferred embodiment, circuitry 35 receives as inputs, signals determinate of whether the control voltage 22 is on, and determinate of whether power is being supplied to the output 40 of the circuit 10. The latter input is supplied by the output of the aforementioned current shunt and amplifier 38. In the preferred embodiment, current shunt and amplifier 38 respectively diverts and amplifies current through output sense resistor, $R_o$ 37, in series with the power output 40. Each of the inputs is received by circuitry 35 as a high or low, i.e., binary 1 or 0, signal determining whether that signal is on or off respectively. This is discussed below.

Preferably, control circuitry 35 comprises logic devices including a BAND gate 36 or inverter (not shown) and an AND gate 34 in the configuration illustrated by FIG. 1. The BAND gate 36 or inverter (not shown) generates the compliment of the input signal from control voltage 22. That is, the BAND gate 36 or inverter (not shown) generates a high signal when control voltage 22 commands that switch 28 be open. Gate 34 performs an AND operation on the above result of the BAND gate 36 or inverter (not shown) and on the output of current shunt and amplifier 38. That is, the result of gate 34 is the result of output of control circuitry 35. In the preferred embodiments, this output is a high signal when control voltage 22 is low/off, and output power is still on.

FIG. 2 provides a table of binary inputs and outputs of a BAND gate 36 (which could also be an inverter) and AND gate 34, and of the preferred embodiment of circuitry 35. As seen from the illustration, the output of the circuitry 35, i.e., output of AND gate 34, is high when both inputs of the AND gate 34 are high. This condition is satisfied if power is delivered to the output 40 of the circuit 10 and the output of the inverter 36 is high. The output of the inverter 36 is high when control voltage 22 to the switch 28 is low/off. In alternative embodiments and based on alternative control signal configurations for switch 22, control circuitry 35 may comprise other components to generate a commanding signal causing the circuit 10 to open when switch 28 is in an improper conduction state.

Returning to FIG. 1, in the preferred embodiment, when power switch 28 is shorted and the output of the control circuitry 35 is high as discussed above, the output of power switch 28 is used to open the circuit 10. As seen in FIG. 1, the fuse control switch 20 receives the output of control circuitry 35. Generally, fuse control switch 20 functions as a current sink upon being commanded on by a signal from circuitry 35. Preferably, device 20 is an NON transistor, with the output of circuitry 35 received at its base, or gate, and allowing current to sink to ground upon receiving a high signal from circuitry 35. Alternatively, device 20 may be a PAP transistor triggered by a low input at its base or gate. Of course, such an alternative embodiment requires an alternative configuration of logic components in the control circuitry 35 to deliver a low signal when the power switch 28 is in an improper conduction state. In the preferred embodiment, when device 20 receives a high signal from circuitry 35, current is sunk from the output of switch 28, thereby powering heating resistor 31 in series with the fuse control switch 20. Resistor 31 heats a thermal fuse 32, in series with switch 28 and power output 40, and placed in thermal proximity to the resistor 31. In turn, in the preferred embodiment, thermal fuse 32 exceeds its temperature rating and blows, opening circuit 10 and preventing unwanted power from being delivered at the power output 40. It will be apparent to one skilled in the art that alternatively, any device, which generates heat upon receiving power, may replace resistor 31.

Figure 3:
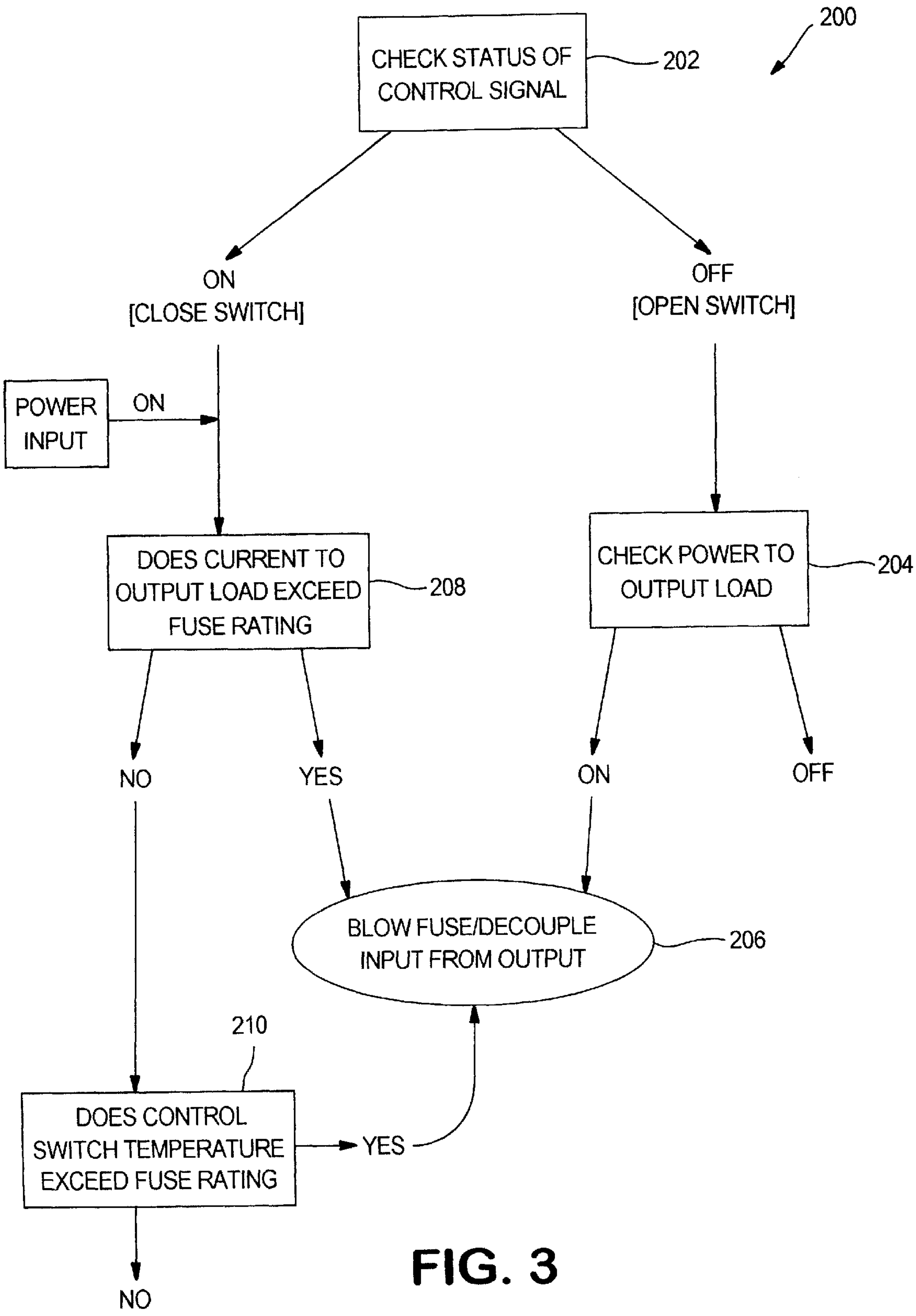
FIG. 3 provides a chart in summary of the conditions and results of the preferred embodiment of fault detection circuit 100, illustrating the conditions for opening the circuit.

FIG. 3 provides a flowchart 200 in summary of the conditions and results of the preferred embodiment of the fault detection circuit, illustrating the conditions for opening the circuit. For clarity reference will be made to the components of FIG. I without reference numerals. Initially, the fault detection circuit checks the status of control signal 202, where, in the preferred embodiment, control signal is on when it commands control switch to be closed, or off when it commands control switch to be open. If the control signal is off, then power to the output load is checked 204. If power exists at the load, then the thermal fuse is blown 206, decoupling the power input from the load. That is, in the above condition, switch 28 is determined to be in an improper conduction state, i.e., shorted, and the circuit is opened. Additionally, the fuse blows when the current output of the control switch exceeds the current rating of the fuse 208. Of course, power input is on when this condition occurs. Further, fuse is placed in proximity to switch such that fuse blows when the switch itself exceeds the fuse's temperature rating 210. These are secondary measures provided in addition to the primary function of the fault detection circuit in the preferred embodiment of the present invention.

Alternative embodiments of the present invention allow for circuitry 35 to determine further conditions of the circuit 10 prior to commanding to decouple the power input 24 from the power output 40. In an example, circuitry 35 may include additional logic components to determine if the power input 24 is on or off, and, further, give weight to that determination in calculating the appropriate signal to generate as its output.

What is claimed is:

1. A fault detection circuit, comprising:

an input voltage coupled to an output load through a control switch;

a control signal regulating the conduction state of said control switch; and fault detection circuitry receiving said control signal and a signal indicative of the energy delivered to said load, and adapted to determine if said control switch is in the proper conduction state based on said control signal, said fault detection circuit further adapted to decouple said input voltage from said load using said energy delivered to said output load if said control switch is in an improper conduction state;

further comprising control circuitry generating a second control signal to decouple from said load when said control switch is in aid improper conduction state;

wherein said fault detection circuitry comprises fuse circuitry coupled to a second switch, said fuse circuitry being disposed between said input voltage and said load, and wherein said control circuitry receives said control signal and said signal indicative of the energy delivered to said load and generates said second control signal to control the conduction state of said second switch, wherein if said control switch is in an improper conduction state, said second switch diverts energy at said load through said fuse circuitry thereby decoupling said load from said input voltage; and wherein said control circuitry includes an inverter receiving said control signal and generating an inverted control signal, and an AND gate receiving said inverted control signal and said signal indicative of the energy delivered to said load and generating said second control signal.

2. A fault detection circuit, comprising:

an input voltage coupled to an output load through a control switch;

a control signal regulating the conduction state of said control switch; and fault detection circuitry receiving said control signal and a signal indicative of the energy delivered to said load, and adapted to determine if said control switch is in the proper conduction state based on said control signal, said fault detection circuit further adapted to decouple said input voltage from said load using said energy delivered to said output load if said control switch is in an improper conduction state;

further comprising control circuitry generating a second control signal to decouple from said load when said control switch is in aid improper conduction state;

wherein said fault detection circuitry comprises fuse circuitry coupled to a second switch, said fuse circuitry being disposed between said input voltage and said load, and wherein said control circuitry receives said control signal and said signal indicative of the energy delivered to said load and generates said second control signal to control the conduction state of said second switch, wherein if said control switch is in an improper conduction state, said second switch diverts energy at said load through said fuse circuitry thereby decoupling said load from said input voltage; and wherein said fuse circuitry comprises a heating resistor and a thermal fuse, wherein said heating resistor heats said fuse and blows said fuse when said second switch conducts thereby decoupling said load from said input voltage.

3. A circuit as claimed in claim 2, wherein said thermal fuse being coupled to said control switch, and said thermal fuse blowing when current through said switch exceeds said fuse's current rating.

4. A circuit as claimed in claimed 2, wherein said thermal fuse being in thermal proximity to said control switch, and said fuse blowing when temperature of said switch exceeds said fuse's temperature rating.

5. A method for fault detection circuit operation, comprising the steps of:

coupling an input voltage to a load through a control switch;

regulating the conduction state of said control switch with a control signal;

determining if said control switch is in a proper conduction state based on said control signal and the energy delivered to said load;

decoupling said input voltage from said load using said energy delivered to said load if said control switch is in an improper conduction state;

generating a signal indicative of the energy delivered to said load;

inverting said control signal;

ANDing said inverted control signal and said signal indicative of the energy delivered to said load, and generating a second control signal;

coupling fuse circuitry to said load and a second switch; and controlling said second switch with said second control signal so that if said control switch is in an improper conduction state, said energy delivered to said load is transmitted through said fuse circuitry and said second switch thereby decouples said input voltage from said load.

6. A method for fault detection circuit operation, comprising the steps of:

coupling an input voltage to a load through a control switch;

regulating the conduction state of said control switch with a control signal;

determining if said control switch is in a proper conduction state based on said control signal and the energy delivered to said load;

decoupling said input voltage from said load using said energy delivered to said load if said control switch is in an improper conduction state;

generating a signal indicative of the energy delivered to said load;

inverting said control signal;

ANDing said inverted control signal and said signal indicative of the energy delivered to said load, and generating a second control signal;

coupling fuse circuitry to said load and a second switch;

controlling said second switch with said second control signal so that if said control switch is in an improper conduction state, said energy delivered to said load is transmitted through said fuse circuitry and said second switch thereby decoupling said input voltage from said load;

using said energy through said fuse circuitry to heat a thermal element;

placing said thermal element in thermal proximity to a thermal fuse; and blowing said thermal fuse using heat transmitted from said thermal element thereby decoupling said input voltage from said load.

7. A method as claimed in claim 6 further comprising the steps of:

placing said thermal fuse in thermal proximity to said control switch; and blowing said fuse when the temperature of said switch exceeds said fuse's temperature rating.

8. A fault detection circuit, comprising:

an input voltage;

an output load;

a control-switch controllable coupling said input voltage to said load;

control signal regulating the conduction state of said control switch;

fault detection circuitry receiving said control signal and a signal indicative of the energy delivered to said load, and adapted to determine if said control switch is in the proper conduction state based on said control signal;

fuse circuitry disposed between said input voltage and said load, and wherein said fault detection circuitry receives said control signal and said signal indicative of the energy delivered to said load, wherein if said control switch is in an improper conduction state, said fault detection circuitry diverts said energy at said load through said fuse circuitry thereby decoupling said load from said input voltage;

wherein said fault detection circuitry comprises a second switch, and wherein control circuitry receives said control signal and said signal indicative of the energy delivered to said load and generates said second control signal to control the conduction state of said second switch, wherein if said control switch is in an improper conduction state, said second switch diverts energy at said load through said fuse circuitry thereby decoupling said load from said input voltage;

wherein said control circuitry includes an inverter receive no said control signal and generating an inverted control signal, and an AND gate receiving said inverted control signal and said signal indicative of the energy delivered to said load, and generating said second control signal.

9. A fault detection circuit, comprising:

an input voltage;

an output load;

a control switch controllable coupling said input voltage to said load;

control signal regulating the conduction state of said control switch;

fault detection circuitry receiving said control signal and a signal indicative of the energy delivered to said load, and adapted to determine if said control switch is in the proper conduction state based on said control signal; and fuse circuitry disposed between said input voltage and said load;

wherein said fault detection circuitry receives said control signal and said signal indicative of the energy delivered to said load, wherein if said control switch is in an improper conduction state, said fault detection circuitry diverts said energy at said load through said fuse circuitry thereby decoupling said load from said input voltage;

wherein said fault detection circuitry comprises a second switch, and wherein control circuitry receives said control signal and said signal indicative of the energy delivered to said load and generates said second control signal to control the conduction state of said second switch, wherein if said control switch is in an improper conduction state, said second switch diverts energy at said load through said fuse circuitry thereby decoupling said load from said input voltage;

wherein said fuse circuitry comprises a heating resistor and a thermal fuse, wherein said heating resistor heats said fuse and blows said fuse when said second switch conducts thereby decoupling said load from said input voltage.

10. A circuit as claimed in claim 9, wherein said thermal fuse being coupled to said control switch, and said thermal fuse blowing when current through said switch exceeds said fuse's current rating.

11. A circuit as claimed in claim 9, wherein said thermal fuse being in thermal proximity to said control switch, and said fuse blowing when temperature of said switch exceeds said fuse's temperature rating.

* * * * *